United States Patent [19]

Kohno et al.

[11] Patent Number: 4,696,267
[45] Date of Patent: Sep. 29, 1987

[54] CYLINDER BLOCK STRUCTURE FOR INTERNAL COMBUSTION ENGINE

[75] Inventors: Kouji Kohno; Hiroichi Takubo; Toshinobu Ito, all of Hiroshima, Japan

[73] Assignee: Mazda Motor Corporation, Japan

[21] Appl. No.: 790,508

[22] Filed: Oct. 23, 1985

[30] Foreign Application Priority Data

Oct. 27, 1984 [JP] Japan ................................ 59-226139
Oct. 27, 1984 [JP] Japan ................................ 59-226140

[51] Int. Cl.⁴ ............................................. F02B 75/06
[52] U.S. Cl. .................................. 123/192 B; 123/572
[58] Field of Search ............ 123/192 R, 192 B, 41.86, 123/572; 74/603, 604

[56] References Cited

U.S. PATENT DOCUMENTS

| | | | |
|---|---|---|---|
| 4,000,666 | 1/1977 | Ito et al. ........................ | 123/192 B |
| 4,095,579 | 6/1978 | Iwasa et al. ..................... | 123/192 B |
| 4,125,036 | 11/1978 | Nakamura et al. ............. | 123/192 B |
| 4,493,295 | 1/1985 | Amperer ......................... | 123/41.86 |
| 4,501,234 | 2/1985 | Toki et al. ...................... | 123/41.86 |
| 4,508,069 | 4/1985 | Dobler et al. ................... | 123/192 B |
| 4,563,986 | 1/1986 | Nakano ........................... | 125/572 |
| 4,601,267 | 7/1986 | Kronich ........................... | 123/41.86 |

*Primary Examiner*—Craig R. Feinberg
*Assistant Examiner*—David A. Okonsky
*Attorney, Agent, or Firm*—Gerald J. Ferguson, Jr.; Michael P. Hoffman; Ronni S. Malamud

[57] ABSTRACT

A cylinder block is provided with a balancer case for accommodating a balance shaft. A blowby passage communicating the interior of the crankcase and the interior of the cylinder head for returning blowby to the intake system is provided to extend through a side wall of the cylinder block and the interior of the balancer case, the interior of the balancer case forming a part of the blowby passage.

11 Claims, 4 Drawing Figures

CYLINDER BLOCK STRUCTURE FOR INTERNAL COMBUSTION ENGINE

BACKGROUND OF THE INVENTION

1. Field of the Invention

This invention relates to a cylinder block structure for an internal combustion engine.

2. Description of the Prior Art

As is disclosed in Japanese Unexamined Patent Publication No. 57(1982)-135210, there has been known an engine structure in which the interior of the crankcase and the interior of the cylinder-head cover are communicated with each other by a blowby passage, and blowby in the interior of the cylinder-head cover is drawn through the blowby passage and returned to the intake system, thereby preventing the blowby from being discharged into the atmosphere.

However, the blowby generally contains oil mist and it is not preferable, from the viewpoint of oil consumption, to return the blowby to the intake system to be burnt as it contains oil components.

In four-cylinder engines, the pistons are generally arranged to reciprocate in different phases so that when the pistons of the first and fourth cylinders are at the top dead center, the pistons of the second and third cylinders are at the bottom dead center, though this depends on the preset firing order. In response to the reciprocating motion of the pistons, the pressure in the crankcase below the cylinder bores rises and falls. This pressure vibration in the crankcase is enhanced as the engine speed increases. Accordingly, the pressure vibration is enhanced by improved engine performance, so the strength of the engine components has to be increased, which makes it more difficult to reduce the weight of the engine. Since the pistons of the first and second cylinders which are adjacent to each other move in opposite directions as do the pistons of the third and fourth cylinders which are adjacent to each other, air is interchanged between the portions in the crankcase respectively corresponding to the adjacent cylinders, i.e., the first and second cylinders, and the third and fourth cylinders, thereby damping the pressure vibration in the crankcase. However, a partition wall for supporting the crankshaft is provided between the portions in the crankcase below the respective adjacent cylinders, thereby elongating the air passage through which air is interchanged and reducing the damping effect, thereby increasing the moving resistance of the pistons and increasing drive loss. Also, movement of air is apt to cause oil mist in the vicinity of the oil pan to mingle with the air. This is not desirable from the viewpoint of oil consumption since the oil mist mingling with the air is fed to the intake system together with blowby and is burnt in the combustion chambers.

SUMMARY OF THE INVENTION

In view of the foregoing observations and description, the primary object of the present invention is to provide a cylinder block structure in which the oil components contained in the blowby can be effectively separated and recovered from the blowby before the blowby is returned to the intake system, thereby reducing oil consumption.

Another object of the present invention is to provide a cylinder block structure in which oil consumption is reduced and, at the same time, the pressure vibration in the crankcase due to the movement of the pistons can be effectively damped.

The cylinder block in accordance with the present invention is provided with a balancer case for accommodating a balance shaft. A blowby passage communicating the interior of the crankcase with the interior of the cylinder head for returning blowby to the intake system is provided to extend through a side wall of the cylinder block and the interior of the balancer case.

In the cylinder block structure of the present invention, blowby discharged from the combustion chamber around the piston is returned to the intake system through the blowby passage and allowed to settle in the interior of the balancer case so that oil components of the blowby are separated therefrom.

In one preferred embodiment of the present invention, the cylinder block is for a four-cylinder in-line engine, and the balancer case is provided to extend through the partition wall between the crank chambers corresponding to the first and second cylinders and the partition wall between the crank chambers corresponding to the third and fourth cylinders. The crank chambers corresponding to the first and second cylinders are mutually communicated by way of the interior of the balancer case, and the crank chambers corresponding to the third and fourth cylinders are mutually communicated by way of the interior of the balancer case.

In the cylinder block of the preferred embodiment, since the crank chambers corresponding to the first and second cylinders and crank chambers corresponding to the third and fourth cylinders are mutually communicated by the interiors of the balancer case, air can be interchanged, through a relatively short passage, between the crank chambers corresponding to the first and second cylinders and between the crank chambers corresponding to the third and fourth cylinders in which the pistons are driven in different phases, whereby the pressure vibration in the crankcase due to movement of the pistons can be effectively damped and the moving resistance of the pistons can be reduced.

DESCRIPTION OF THE PREFERRED EMBODIMENT

Figure 1:
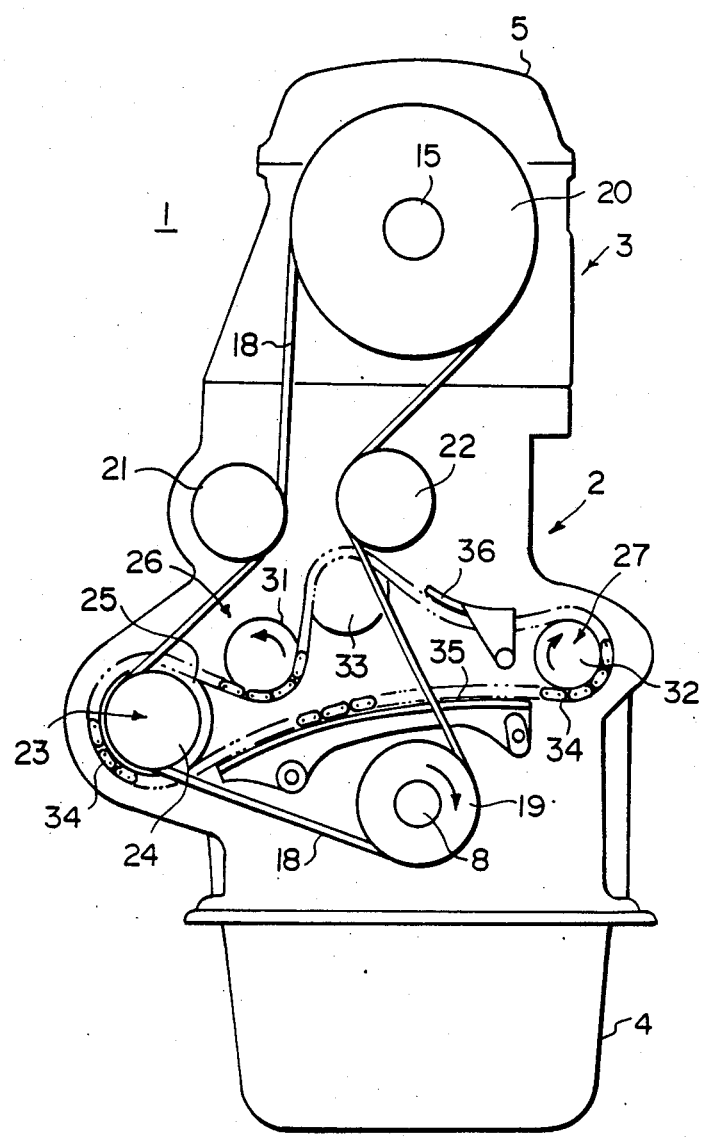
FIG. 1 is a schematic front view of an internal combustion engine in which a cylinder block structure in accordance with an embodiment of the present invention is employed.

In FIGS. 1 to 4, a four-cylinder, in-line engine 1 having a cylinder block structure in accordance with an embodiment of the present invention comprises a cylinder block 2, a cylinder head 3 attached to the cylinder block 2, a oil pan 4 mounted on the underside of the cylinder block 2 and a cylinder-head cover 5 attached to the cylinder head 3.

In each cylinder bore 2a of the cylinder block 2 is inserted a piston 6 which is connected to a crankshaft 8 by way of a connecting rod 7. Partition walls 2c are provided in the part of the cylinder block 2 forming a crankcase 2b at portions corresponding to the wall portions between the cylinder bores 2a. The crankshaft 8 is supported on the partition walls 2c.

A blowby passage 9 is provided to communicate the crank chambers A, i.e., the part of the interior of the crankcase 2b corresponding to each cylinder bore 2a, with the head chamber B defined between the cylinder-head cover 5 and the cylinder head 3. A part of the blowby passage 9 is formed in a vertical bulged portion formed in a side wall 2d of the cylinder block 2. The upper portion of the blowby passage 9 extends through the cylinder head 3 and opens into the head chamber B.

Figure 2:
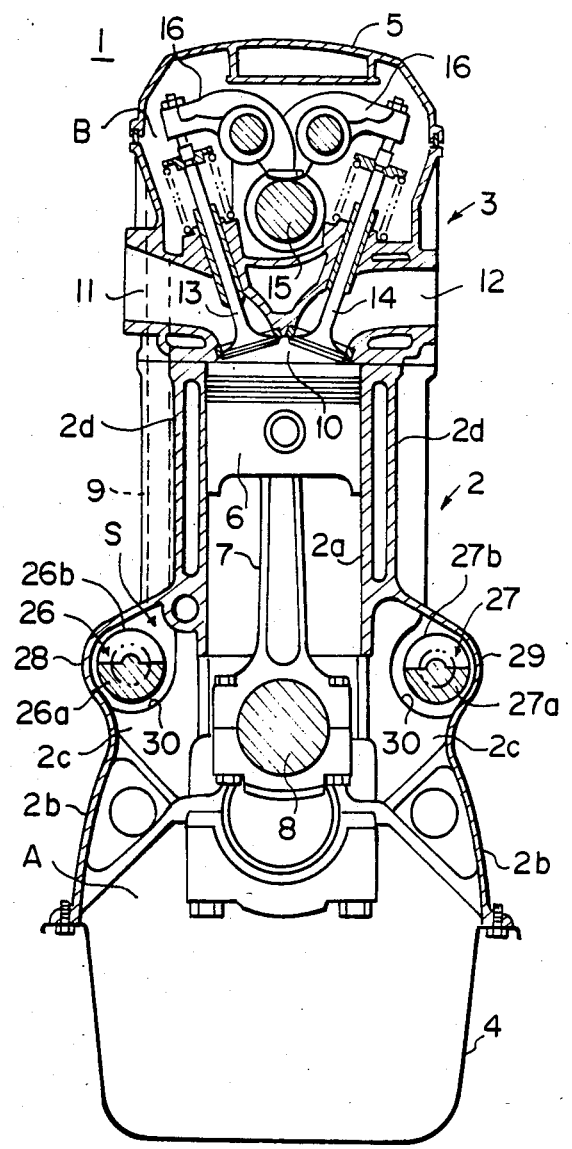
FIG. 2 is a cross-sectional view of the engine.
Figure 3:
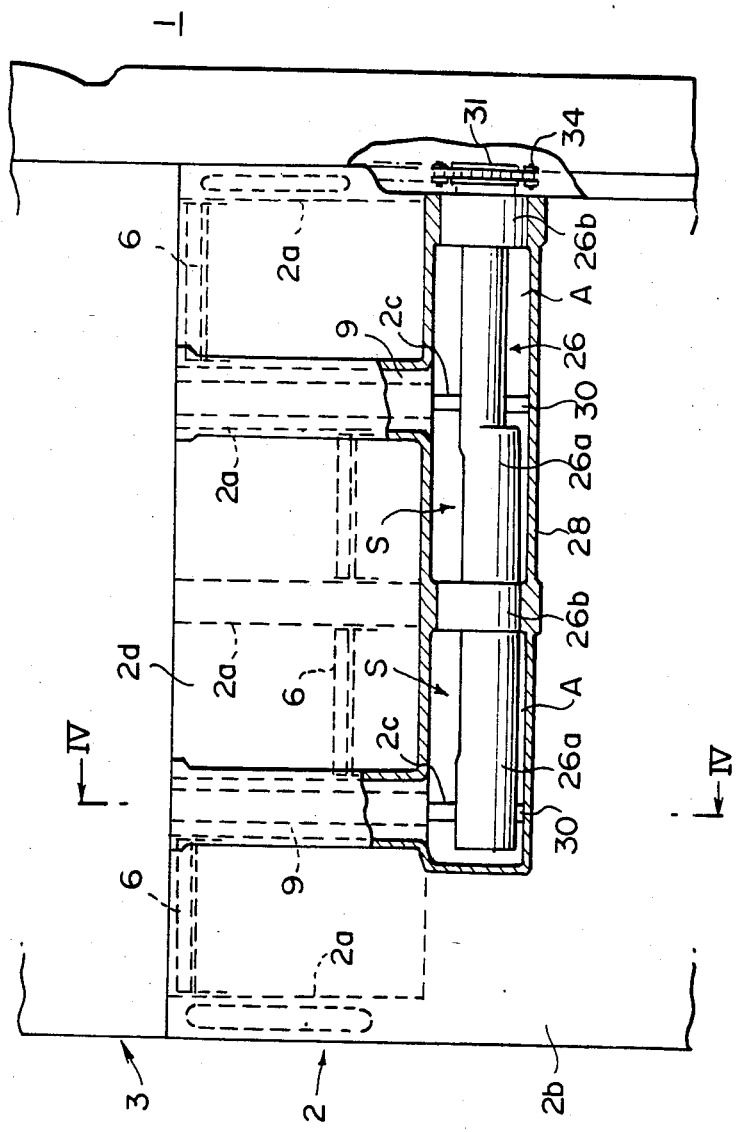
FIG. 3 is a fragmentary cross-sectional view of teh engine.
Figure 4:
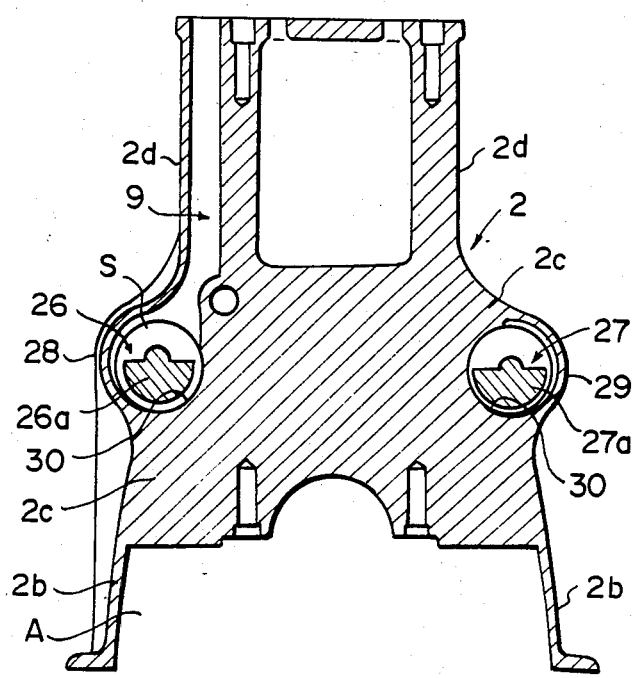
FIG. 4 is a cross-sectional view taken along line IV—IV in FIG. 3.

In the cylinder head 3 are formed intake ports 12 and exhaust ports 11 which open into combustion chambers 10 and are respectively opened and closed by intake valves 14 and exhaust valves 13. The intake valves 14 and the exhaust valves 13 are opened and closed by rocker arms 16 driven by a camshaft 15 (FIG. 2).

The front end portion of the crankshaft 8 projects from the front face of the cylinder block 2. A crank pulley 19 is fixedly mounted on the projecting front end portion of the crankshaft 8 and a timing belt 18 for driving the camshaft 15 is passed around the crank pulley 19. The timing belt 18 is passed around a cam pulley 20 fixed to the camshaft 15 and idler pulleys 21 and 22 to drive the camshaft 15. The timing belt 18 is further passed around an intermediate pulley 24 on an intermediate shaft 23 to also drive the intermediate shaft 23. The diameter of the cam pulley 20 is twice as large as that of the crank pulley 19 so that the camshaft 15 is driven at a speed that is half of the speed of the crankshaft 8. The diameter of the intermediate pulley 24 is smaller than that of the crankshaft 8 so that the intermediate shaft 23 is driven at a speed that is higher than the speed of the crankshaft 8.

Left and right balance shafts 26 and 27 are disposed in predetermined positions on the left and right sides of the axis of the crankshaft 8. That is, the cylinder block 2 is further provided with left and right balancer cases 28 and 29 formed in bulged portions extending fore and aft on the left and right side walls 2d of the cylinder block 2 at a lower portion slightly above the crankcase 2b. The left and right balance shafts 26 and 27 are respectively accommodated in the left and right balancer cases 28 and 29 to extend parallel to the crankshaft 8. The balance shafts 26 and 27 are provided with balance weights 26a and 27a eccentrically formed thereon, and the shaft portions 26b and 27b of the balance shafts 26 and 27 are supported for rotation at a front end portion and an intermediate portion of the cylinder block 2 (See FIG. 3).

The front end portions of the left and right balance shafts 26 and 27 project forward from the front face of the cylinder 2, and chain sprockets 31 and 32 are respectively mounted on the projecting front end portions of the balance shafts 26 and 27. The intermediate shaft 23 is provided with an intermediate sprocket 25 inside said intermediate pulley 24. A timing chain 34 is passed around the sprockets 31 and 32 of the balance shafts 26 and 27, the intermediate sprockets 25 of the intermediate shaft 23 and an idler sprocket 33. The timing chain 34 is guided by chain guides 35 and 36 so that the outer surface of the timing chain 34 is engaged with the sprocket 31 of the left balance shaft 26 and the inner surface of the timing chain 34 is engaged with the sprocket 32 of the right balance shaft 27. Thus, the left and right balance shafts 26 and 27 are rotated in opposite directions. The diameters of the sprockets 31 and 32 are smaller than the diameter of the intermediate sprocket 25 so that the balance shafts 26 and 27 are rotated at a speed higher than that of the intermediate shaft 23. That is, the rotation of the crankshaft 8 is transmitted to the balance shafts 26 and 27 after the rotational speed has been increased by transmission to the intermediate shaft 23 and it is further increased when it is transmitted to the balance shafts 26 and 27 from the intermediate shaft 23 so that the balance shafts 26 and 27 are rotated at a speed twice as high as that of the crankshaft 8. Further, the rotational phase of the balance shafts 26 and 27 is set so that when the pistons 6 are at the top dead center or the bottom dead center, the balance weights 26a and 27a are positioned downward as shown in FIG. 2.

The crank chambers A corresponding to the first and second cylinders and the crank chambers A corresponding to the third and fourth cylinders are mutually communicated by the interiors S of the balancer cases 28 and 29 near the lower ends of the cylinder bores 2a. Said blowby passage 9 communicating the crank chamber A with the head chamber B extends through the interior S of the left balancer case 28. In other words, the interior S of the left balancer case 28 forms a part of the blowby passage 9.

The shaft portion 26b of the left balance shaft 26 is supported in the balancer case 28 at a front end portion of the cylinder block and at the partition wall 2c between the second and third cylinders. The left balance shaft 26 extends through openings 30 formed in the partition walls 2c between the first and second cylinders and between the third and fourth cylinders so that the crank chambers A corresponding to the first and second cylinders are mutually communicated by the opening 30 around the balance shaft 26, and the crank chambers A corresponding to the third and fourth cylinders are similarly mutually communicated by the opening 30 around the balance shaft 26. The outer portion of the left balancer case 28 is integral with the side wall 2d of the cylinder block 2 and the inner portion of the left balancer case 28 opens to the crank case 2b below the pistons 6, whereby the interior S of the balancer case 28 is communicated with the crank chambers A.

The blowby passage 9 is provided in the side wall 2d of the cylinder block 2 between the first and second cylinders and between the third and fourth cylinders, and opens down into the interior S of the left balancer case 28, and opens to the crank chambers A by way of the interior S of the left balancer case 28.

In the cylinder block structure described above, since the crank chambers A corresponding to the first and second cylinders and crank chambers A corresponding to the third and fourth cylinders are mutually communicated by the interiors S of the balancer cases 28 and 29 near the lower ends of the cylinder bores 2a, air can be interchanged, through a relatively short passage, between the crank chambers corresponding to the first and second cylinders and between the crank chambers corresponding to the third and fourth cylinders in which the pistons are driven in different phases, whereby the pressure vibration in the crankcase due to movement of the pistons can be effectively damped and the moving resistance of the pistons can be reduced.

Blowby discharged from the combustion chambers through spaces between the cylinder bores 2a and the pistons 6 is introduced into the interior S of the balancer case 28 from the crankcase 2b and allowed to settle in the interior S of the balancer case 28 for a while so that oil components are separated from the blowby before the blowby is introduced into the interior of the cylinder head 3 through the blowby passage 9. Then the blowby is introduced into the intake system to be burnt again. The oil components separated from the blowby are returned to the oil pan 4 from the balancer case 28.

Though, in the above embodiment, the blowby passage 9 is provided to communicate only with one of the balancer cases (i.e., the left balancer case 28), an additional blowby passage may be provided to communicate with the other balancer case. Further, when two blowby passages are provided, one of them may be used as an oil return passage. Also, the blowby passage 9 may be communicated with the interior S of the balancer case 28 at an intermediate portion thereof though it is communicated with the interior S of the balancer case 28 at the lower end thereof in the embodiment described above. However, the oil components in the blowby can be effectively separated from the blowby when the blowby passage 9 is not simply communicated with the interior of the balancer case 28 but is communicated therewith so that the blowby is caused to pass through the interior S of the balancer case 28.

We claim:

1. A cylinder block structure for an internal combustion engine having a top part on which a cylinder head defining a head chamber with a cylinder-head cover mounted thereon is to be mounted, a lower part on which an oil pan is to be mounted, a plurality of cylinder bores in which pistons are to be inserted, and partition walls which are provided between adjacent cylinder bores to support a crank-shaft, wherein the improvement comprises a balancer case which is formed on a side wall of the cylinder block integrally therewith to accommodate therein a balance shaft which is provided with a balance weight and is operatively connected to the crankshaft to be driven thereby, and a blowbly passage which communicates between an interior of a crankcase in the cylinder block and the head chamber defined by said cylinder head and the cylinder-head cover to be mounted thereon, the interior of the balancer case forming a part of the blowby passage, wherein said balancer case is formed at a position higher than the position where the crankshaft is supported, wherein said balancer case extends through said partition walls between said cylinders and wherein said blowby passage communicating with said head chamber opens to the balancer case in one of said partition walls.

2. A cylinder block structure as defined in claim 1 in which said balancer case is formed in a bulged portion formed in the side wall of the cylinder block to extend fore and aft, and the inner side of the balancer case opens to the crankcase below the pistons.

3. A cylinder block structure as defined in claim 1 in which said blowby passage is formed in a bulged portion formed in the side wall of the cylinder block so as to extend vertically.

4. A cylinder block structure as defined in claim 1 in which said balance shaft is disposed in parallel to the crankshaft.

5. A cylinder block structure as defined in claim 4 in which said balance shafts are disposed symmetrically with respect to the rotational axis of the crankshaft and are respectively accommodated in balancer cases.

6. A cylinder block structure as defined in claim 5 in which only one of said balancer cases forms a part of the blowby passage.

7. A cylinder block structure for a four-cylinder internal combustion engine having a top part on which a cylinder head defining a head chamber with a cylinder-head cover mounted thereon is to be mounted, a lower part on which an oil pan is to be mounted, first to fourth cylinder bores in which pistons are arranged to reciprocate wherein, the pistons of the first and second cylinders are out of phase with respect to each other and the pistons of the third and fourth cylinders are out of phase with respect to each other, and partition walls which are provided between adjacent cylinder bores to support a crankshaft, wherein the improvement comprises a balancer case which is formed on a side wall of the cylinder block intergrally therewith to accommodate therein a balance shaft which is provided with a balance weight and is operatively connected to the crankshaft to be driven thereby, and a blowby passage which communicate between an interior of a crankcase in the cylinder block and the head chamber defined by said cylinder head and the cylinder-head cover to be mounted thereon, the balancer case extending through the partition walls between the first and second cylinders and between the third and fourth cylinders, and the crank chambers below the first and second cylinder bores, and the crank chambers below the third and fourth cylinder bores being mutually communicated by the interior of the balance case, wherein said balancer case is formed at a position higher than the position where in the crankshaft is supported.

8. A cylinder block structure as defined in claim 7 in which said balance shaft is supported for rotation in the balancer case at a front end portion of the cylinder block and at the partition wall between the second and third cylinders, and extends through opening formed in the partition walls between the first and second cylinders and between the third and fourth cylinders.

9. A cylinder block structure as defined in claim 7 in which said blowby passage comprises a part provided in a side wall cylinder block between the first and second cylinders and between the third and fourth cylinders and opening down into the interior of the balancer case, the interior of the balancer case forming a part of the blowby passage.

10. A cylinder block structure as defined in claim 7 in which the pistons are arranged to reciprocate in different phases so that when one of the pistons of the first and second cylinders is at the top dead center, the other piston is at the bottom dead center, and when one of the pistons of the third and fourth cylinders is at the top dead center, the other piston is at the bottom dead center.

11. A cylinder block structure as defined in claim 10 in which the pistons are arranged to reciprocate in different phases so that when the pistons of the first and fourth cylinders are at the top dead center, the pistons of the second and third cylinders are at the bottom dead center.

* * * * *